(12) United States Patent
Park et al.

(10) Patent No.: US 10,243,210 B2
(45) Date of Patent: Mar. 26, 2019

(54) CATHODE ACTIVE MATERIAL, CATHODE AND LITHIUM BATTERY INCLUDING THE SAME, AND METHOD OF PREPARING THE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Junho Park, Seoul (KR); Kwangjin Park, Seongnam-si (KR); Dongwook Shin, Suwon-si (KR); Jaegu Yoon, Suwon-si (KR); Sukgi Hong, Seongnam-si (KR)

(73) Assignees: SAMSUNG ELECTRONICS CO. LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 345 days.

(21) Appl. No.: 15/152,861

(22) Filed: May 12, 2016

(65) Prior Publication Data
US 2017/0179484 A1 Jun. 22, 2017

(30) Foreign Application Priority Data
Dec. 16, 2015 (KR) .................. 10-2015-0180199

(51) Int. Cl.
*H01M 4/00* (2006.01)
*H01M 4/505* (2010.01)
(Continued)

(52) U.S. Cl.
CPC ............ *H01M 4/505* (2013.01); *C01G 53/50* (2013.01); *H01M 2/1653* (2013.01);
(Continued)

(58) Field of Classification Search
CPC ........... H01M 10/0569; H01M 4/5825; H01M 10/0525; H01M 4/625
See application file for complete search history.

(56) References Cited

U.S. PATENT DOCUMENTS 9,979,014 B2 5/2018 Kim et al.
2014/0106225 A1* 4/2014 Matsuno ............... H01M 4/485
429/221

(Continued)

FOREIGN PATENT DOCUMENTS

KR 1020150049288 A 5/2015
KR 1020150063954 A 6/2015
(Continued)

*Primary Examiner* — Cynthia H Kelly
*Assistant Examiner* — Monique M Wills
(74) *Attorney, Agent, or Firm* — Cantor Colburn LLP

(57) ABSTRACT

A cathode active material includes a core capable of intercalating and deintercalating lithium ions; and a coating layer on at least a portion of the core, wherein the coating layer includes a composite including a metal oxide compound and a phosphate compound, the metal oxide compound is at least one compound selected from a lithium metal oxide and a metal oxide, the phosphate compound is at least one compound selected from a lithium phosphate, a lithium metal phosphate, and a metal phosphate, and a weight ratio of the metal oxide compound to the phosphate compound is from greater than 0 to about 1.

25 Claims, 15 Drawing Sheets

(51) Int. Cl.

| | |
|---|---|
| *H01M 2/16* | (2006.01) |
| *H01M 4/04* | (2006.01) |
| *H01M 4/131* | (2010.01) |
| *H01M 4/133* | (2010.01) |
| *H01M 4/1391* | (2010.01) |
| *H01M 4/525* | (2010.01) |
| *H01M 4/62* | (2006.01) |
| *H01M 4/66* | (2006.01) |
| *H01M 10/0568* | (2010.01) |
| *H01M 10/0569* | (2010.01) |
| *H01M 10/0585* | (2010.01) |
| *H01M 4/36* | (2006.01) |
| *H01M 4/58* | (2010.01) |
| *C01G 53/00* | (2006.01) |
| *H01M 4/587* | (2010.01) |
| *H01M 10/0525* | (2010.01) |
| *H01M 4/02* | (2006.01) |

(52) U.S. Cl.
CPC ....... *H01M 4/0404* (2013.01); *H01M 4/0435* (2013.01); *H01M 4/0471* (2013.01); *H01M 4/131* (2013.01); *H01M 4/133* (2013.01); *H01M 4/1391* (2013.01); *H01M 4/364* (2013.01); *H01M 4/366* (2013.01); *H01M 4/525* (2013.01); *H01M 4/5825* (2013.01); *H01M 4/62* (2013.01); *H01M 4/622* (2013.01); *H01M 4/623* (2013.01); *H01M 4/625* (2013.01); *H01M 4/661* (2013.01); *H01M 10/0568* (2013.01); *H01M 10/0569* (2013.01); *H01M 10/0585* (2013.01); *C01P 2002/72* (2013.01); *C01P 2002/85* (2013.01); *C01P 2004/03* (2013.01); *C01P 2004/80* (2013.01); *H01M 4/587* (2013.01); *H01M 10/0525* (2013.01); *H01M 2004/027* (2013.01); *H01M 2004/028* (2013.01); *H01M 2220/20* (2013.01); *H01M 2220/30* (2013.01); *H01M 2300/004* (2013.01)

(56) References Cited

U.S. PATENT DOCUMENTS

| | | | |
|---|---|---|---|
| 2014/0154572 | A1 | 6/2014 | Singh et al. |
| 2014/0322607 | A1 | 10/2014 | Thackeray et al. |
| 2015/0093651 | A1* | 4/2015 | Aihara ............ H01M 10/0562 |
| | | | 429/304 |
| 2015/0171423 | A1* | 6/2015 | Kim ................ H01M 4/366 |
| | | | 429/220 |
| 2015/0228973 | A1 | 8/2015 | Won et al. |

FOREIGN PATENT DOCUMENTS

| | | |
|---|---|---|
| KR | 1020150069338 A | 6/2015 |
| KR | 1020150070853 A | 6/2015 |
| KR | 1020150093539 A | 8/2015 |
| KR | 1020150102405 A | 9/2015 |

* cited by examiner

CATHODE ACTIVE MATERIAL, CATHODE AND LITHIUM BATTERY INCLUDING THE SAME, AND METHOD OF PREPARING THE CATHODE ACTIVE MATERIAL

CROSS-REFERENCE TO RELATED APPLICATION

This application claims priority to and the benefit of Korean Patent Application No. 10-2015-0180199, filed on Dec. 16, 2015, in the Korean Intellectual Property Office, and all the benefits accruing therefrom under 35 U.S.C. § 119, the content of which in its entirety is herein incorporated by reference.

BACKGROUND

1. Field

The present disclosure relates to a cathode active material, a cathode, and a lithium battery including the cathode active material, and a method of preparing the cathode active material.

2. Description of the Related Art

Lithium batteries, particularly, lithium secondary batteries, are widely used as power supplies for portable devices due to their high energy density and ease of design. Since the lithium secondary batteries are used as power supplies for electric vehicles or electric power storage in addition to portable information technology (IT) devices, studies have been conducted to develop lithium secondary batteries having a high energy density or long lifespan.

In order to manufacture lithium secondary batteries for such use, various cathode active materials have been considered.

There is however a need for a cathode active material which is capable of providing improved battery capacity, rate characteristics, and lifespan characteristics to a lithium battery, a cathode, and a lithium battery including the cathode active material, and a method of preparing the cathode active material are needed.

SUMMARY

Provided is a novel cathode active material with improved battery capacity, rate characteristics, and lifespan characteristics.

Provided is a cathode including the cathode active material.

Provided is a lithium battery including the cathode.

Provided is a method of preparing the cathode active material.

Additional aspects will be set forth in part in the description which follows and, in part, will be apparent from the description, or may be learned by practice of the presented embodiments.

According to an aspect, a cathode active material includes: a core capable of intercalating and deintercalating lithium ions; and a coating layer on at least a portion of the core, wherein the coating layer includes a composite including a metal oxide compound and a phosphate compound, the metal oxide compound is at least one compound selected from a lithium metal oxide and a metal oxide, and the phosphate compound is at least one compound selected from a lithium phosphate, a lithium metal phosphate, and a metal phosphate, and wherein a weight ratio of the phosphate compound to the metal oxide compound is in a range of greater than 0 to about 1.

According to another aspect, a cathode includes the cathode active material.

According to yet another aspect, a lithium battery includes: the cathode; an anode; and an electrolyte between the cathode and the anode.

According to an aspect, a method of preparing a cathode active material includes: adding a metal oxide compound precursor and a phosphate compound precursor to a core material capable of intercalating and deintercalating lithium ions to obtain a mixture; drying the mixture; and heat-treating the dried mixture to prepare a cathode active material, the cathode active material including: a core capable of intercalating and deintercalating lithium ions; and a coating layer on at least a portion of the core, wherein the coating layer is a composite coating layer including a metal oxide compound and a phosphate compound, the metal oxide compound is at least one compound selected from a lithium metal oxide and a metal oxide, and the phosphate compound is at least one compound selected from lithium phosphate, a lithium metal phosphate, and a metal phosphate, wherein a weight ratio of the phosphate compound to the metal oxide compound is greater than 0 to about 1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
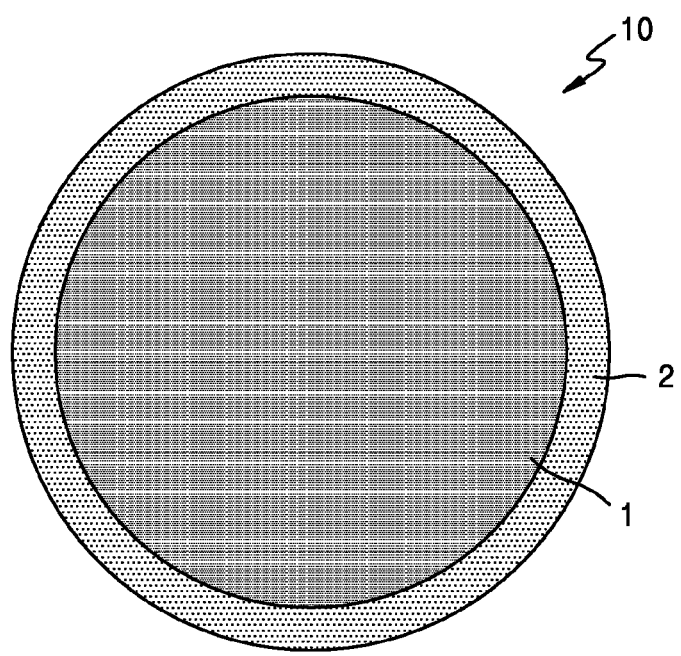
FIG. 1 is a schematic view of a structure of a cathode active material according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

Hereinafter, according to one or more embodiments of the present disclosure, a cathode active material, a cathode and a lithium battery including the cathode active material, and a method of preparing the cathode active material will be described.

As used herein, when a portion is referred to "includes" an element, another element may be further included, rather than excluding the existence of the other element, unless otherwise described.

As used herein, when an element is referred to as being "on" another element, one element can be directly on the other element, or there may be intervening elements. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "combination thereof" refers to a mixture or a combination of the listed elements.

A single component, lithium cobalt oxide ($LiCoO_2$) has generally been used as a material for a cathode active material of a lithium secondary battery. In an effort to increase the capacity of a lithium secondary battery, studies investigating an increase in the amount of nickel in the lithium metal oxide have been conducted. In recent years, one type of lithium cobalt oxide which has been used is a high capacity, lithium composite metal oxide having a layered structure ($Li(Ni-Co-Mn)O_2$ or $Li(Ni-Co-Al)O_2$).

However, preparation of the lithium composite metal oxide, including an increased amount of nickel, requires a large amount of $Li_2CO_3$, and as a result, a large amount of lithium derived from $Li_2CO_3$ remains on a surface of the lithium composite metal oxide. The remaining lithium reacts with water or $CO_2$, and thus generates a base such as $LiOH$ or $Li_2CO_3$. The base reacts with an electrolyte and may generate $CO_2$ gas. Consequently, pressure inside the battery increases, and the capacity, rate characteristics, and lifespan characteristics of a battery may deteriorate.

The cathode active material according to an embodiment includes a core capable of intercalating and deintercalating lithium ions; and a coating layer on at least a portion of the core. The coating layer includes a composite including a metal oxide compound and a phosphate compound, the metal oxide compound is at least one compound selected from a lithium metal oxide and a metal oxide, the phosphate compound is at least one compound selected from a lithium phosphate, a lithium metal phosphate, and a metal phosphate, and a weight ratio of the phosphate compound to the metal oxide compound may be in a range of greater than 0 to about 1.

The cathode active material according to an embodiment of the present disclosure may include a composite including an metal oxide compound and a phosphate compound, and the composite may be on at least a portion of the core capable of intercalating and deintercalating lithium ions.

The composite included in the coating layer has both ion conductive characteristics and protection layer characteristics, and is capable of protecting the core from elution of a metal included in the core and from side reactions which may occur between an electrolyte and a surface of the core.

The metal oxide compound may be at least one compound selected from a lithium metal oxide and a metal oxide. The metal oxide compound structurally stabilizes the core and may suppress side reactions which may occur with an electrolyte, and thus lifespan characteristics of a battery may improve.

The phosphate compound may be at least one compound selected from a lithium phosphate, a lithium metal phosphate, and a metal phosphate. The lithium phosphate and the lithium metal phosphate facilitate migration of lithium ions in the core, and thus the capacity and rate characteristics of a battery may improve.

The metal oxide compound and the phosphate compound may be formed by a reaction which occurs with a part of, or all of the lithium present on a surface of the core. The lithium present on a surface of the core may be derived from lithium included in the core or from a separate lithium source. In some embodiments, the lithium present on a surface of the core may be derived from a lithium compound such as $Li_2CO_3$, LiOH, or/and $Li_2SO_4$.

A weight ratio of the phosphate compound to the metal oxide compound may be in a range of greater than 0 to about 1. For example, a weight ratio of the phosphate compound to the metal oxide compound may be in a range of greater than 0 to about 0.75, or for example, may be in a range of greater than 0 to about 0.5.

The cathode active material including the coating layer including the metal oxide compound and the phosphate compound and having a weight ratio within the range defined above, may increase the capacity of a battery, suppress side reactions with an electrolyte, and may decrease generation of gas such as $CO_2$, and thus the lifespan characteristics as well as the rate characteristics of a battery may improve.

In some embodiments, the metal oxide compound may be a lithium metal oxide, and the phosphate compound may include a lithium phosphate and a lithium metal phosphate.

In some embodiments, the metal oxide compound may further include a metal phosphate.

The lithium metal oxide and the metal oxide may be a compound represented by Formula 1:

$$Li_{1-x}MO_2 \qquad \text{Formula 1}$$

In Formula 1, x may satisfy 0≤x≤1, and M may be at least one metal element selected from iron (Fe), cobalt (Co), manganese (Mn), aluminum (Al), nickel (Ni), zirconium (Zr), zinc (Zn), and vanadium (V).

For example, M may be at least one metal element selected from Fe and Co. For example, M may be Fe.

When M is selected from at least one of the metal elements provided above, an amount of lithium remaining on a surface of the core as a result of a reaction between an electrolyte and a surface of the core and an amount of the generated gas may decrease, and thus the capacity, rate characteristics, and lifespan characteristics may improve.

The lithium phosphate may include at least one compound selected from $Li_3PO_4$, $LiPO_3$, $Li_4P_2O_7$, and $Li_2O$—$P_2O_5$. For example, the lithium phosphate may be $Li_3PO_4$.

The lithium metal phosphate and the metal phosphate may be at least one compound selected from a compound represented by Formula 2 and a compound represented by Formula 3.

$$Li_{1-y}(M1)PO_4 \qquad \text{Formula 2}$$

In Formula 2, y may satisfy 0≤y≤1, and M1 may be at least one metal element selected from Fe, Co, V, Mn, Ni, Zr, and Zn.

$$Li_{1-z}(M2)P_2O_7 \qquad \text{Formula 3}$$

In Formula 3, z may satisfy 0≤z≤1, and M2 may be at least one metal element selected from Fe, Co, V, Mn, Ni, Zr, and Zn.

In some embodiments, M1 and M2 may be Fe.

M1 and M2 may have a molar ratio in a range of about 0.0001 to about 0.1 based on 1 mole (mol) of the whole metal element except lithium. For example, M1 and M2 may have a molar ratio in a range of about 0.0001 to about 0.075, or for example, in a range of about 0.0001 to about 0.05 based on 1 mol of the compound, except for lithium.

The element P may have a molar ratio in a range of about 0.0001 to about 0.1 based on 1 mol of the compound, except for lithium. For example, the element P may have a molar ratio in a range of about 0.0001 to about 0.075, or for example, in a range of about 0.0001 to about 0.05 based on 1 mol of the compound, except for lithium.

When the elements M1 and M2 or/and the element P have molar ratios within these ranges, an amount of lithium remaining on a surface of the core due to a reaction between an electrolyte and a surface of the core, without a corresponding change in a structure of the core, may decrease, and a degree of lithium ion diffusion may increase. As a result, the capacity, rate characteristics, and lifespan characteristics of a battery may be improved.

The phosphate compound may further include a compound represented by Formula 4:

$$Li_a(M3)(PO_4)_3 \qquad \text{Formula 4}$$

In Formula 4, a may satisfy 0≤a≤1, and M3 may be at least one metal element selected from Fe, V, and Ti.

The phosphate compound may be a sodium super ionic conductor (NASICON) compound, for example, a compound having a structure of $Na_{1+x}Zr_2Si_xP_{3-x}O_{12}$ (where, 0<x<3), which facilitates the movement of lithium ions by providing channel through which lithium ions migrate, and thus the capacity and rate characteristics of a battery may improve.

The coating layer according to an embodiment may include $LiFeO_2$ and $Li_3PO_4$.

The coating layer according to an embodiment may further include $FePO_4$, $Li_3Fe_2(PO_4)_3$, and $LiFePO_4$.

An amount of the coating layer may be in a range of about 0.1 weight percent (wt %) to about 10 wt % based on the total weight of the core. For example, an amount of the coating layer may be in a range of about 0.1 wt % to about 8 wt %, or, for example, about 0.1 wt % to about 7 wt %, or about 0.2 wt % to about 5 wt %, based on the total weight of the core.

The cathode active material has a peak intensity of a phosphorous 2p (P2P) binding energy in a range of about 130 electron volts (eV) to about 135 eV which is greater than a peak intensity of iron-2P (Fe2P) binding energy in a range of about 710 eV to about 715 eV, as measured by X-ray photoelectron spectroscopy (XPS) analysis.

In the cathode active material, a peak intensity ratio of the phosphorous 2p binding energy to the iron 2p binding energy is in a range of about 1:0.1 to about 1:0.9. For example, in the cathode active material, a peak intensity ratio of the phosphorous 2p binding energy to the iron 2p binding energy is in a range of about 1:0.1 to about 1:0.8, for example, about 1:0.1 to about 1:0.6, or about 1:0.1 to about 1:0.4.

When an amount of the coating layer based on the total weight of the core is within the ranges provided above, an amount of lithium present on a surface of the core may be less than an amount of lithium present on a surface of a core capable of intercalating and deintercalating lithium ions, which does not include the coating layer, and thus, a degree of lithium ion diffusion may increase, which may result in an improvement of the capacity, rate characteristics, and lifespan characteristics of a battery.

In the cathode active material, an amount of the lithium present at the surface of the core may be about 20 wt % to about 60 wt % of an amount of lithium present on a surface of a core capable of intercalating and deintercalating lithium ions, which does not include the coating layer. For example, in the cathode active material including a coating layer on a core capable of intercalating and deintercalating lithium ions, an amount of the lithium present may be about 23 wt % to about 53 wt % of an amount of lithium present in the cathode active material including a core capable of intercalating and deintercalating lithium ions, which does not include the coating layer.

The coating layer may have a mono-layered (e.g. a single layer) structure or a multi-layered structure. For example, the coating layer may be a mono-layer.

FIG. 1 is a schematic view of a structure of a cathode active material 10 according to an embodiment.

As shown in FIG. 1, the cathode active material 10 includes a coating layer 2 on a core 1 capable of intercalating and deintercalating lithium ions. The coating layer 2 is shown in FIG. 1 as a mono-layer (e.g. a single layer), but is not limited thereto, and may also have a multi-layer structure. The coating layer 23 may include a composite of a metal oxide compound and a phosphate compound.

The coating layer 2 may be a non-continuous coating layer e.g. an island type coating layer, a substantially continuous coating layer, or a continuous coating layer.

A thickness of the coating layer 2 may be in a range of tens of nanometers to hundreds of nanometers. For example, the thickness of the coating layer may be in a range of about 10 to about 900 nanometers, or for example, about 20 to about 800 nanometers, or for example, about 30 to about 750 nanometers.

The core 1 capable of intercalating and deintercalating lithium ions may have a layered structure including at least one layer.

The core capable of intercalating and deintercalating lithium ions may be a compound represented by Formula 5:

$$Li_{a1}Ni_{b1}(M4)_{c1}O_2 \quad \text{Formula 5}$$

In Formula 5, a1, b1, and c1 may satisfy $0.8<a1<1.3$, $0.5 \le b1<1.0$, and $0<c1 \le 0.5$; and M4 may be at least one metal element selected from Mn, V, Cr, Fe, Co, Zr, Re, Al, B, Mg, Ga, Ge, Nb, Zn, Cd, Ti, V, Ca, Si, Cu, Sn, Sr, Sc, W, and Y.

In some embodiments, b1 may satisfy $0.6 \le b1<1.0$, or, for example, $0.7 \le b1<1.0$, or $0.8 \le b1<1.0$.

The core capable of intercalating and deintercalating lithium ions includes a large amount of nickel, and thus a capacity of a battery may be increased as compared to a capacity of a battery including other transition metal elements such as cobalt (Co) or/and manganese (Mn). This is because nickel generates two electrons during a charging process at which deintercalation of lithium occurs.

An average particle diameter of the core capable of intercalating and deintercalating lithium ions may be in a range of about 0.1 micrometers (μm) to about 20 μm. For example, an average particle diameter of the core capable of intercalating and deintercalating lithium ions may be in a range of about 0.1 μm to about 10 μm.

As used herein, "average particle diameter" or "D50 particle size" refers to a particle diameter corresponding to 50% of the particles in a distribution curve in which particles are accumulated in the order of particle diameter from the smallest particle to the largest particle, and a total number of the accumulated particles is 100%. D50 may be measured by a method known to those of skill in the art. For example, D50 may be measured by using a particle size analyzer, or from images obtained by a transmission electron microscopy (TEM) or a scanning electron microscopy (SEM). In some embodiments, for example, D50 may be measured by a dynamic light-scattering method, counting the number of particles having a predetermined size range, performing data analysis, and calculating an average particle diameter.

According to another embodiment, a cathode may include the cathode active material.

According to yet another embodiment, a lithium battery may include the cathode, an anode, and an electrolyte between the cathode and the anode. The lithium battery may be a lithium primary battery or a lithium secondary battery. For example, the lithium battery may be a lithium secondary battery.

Hereinafter, a method of preparing a lithium secondary battery may be described as follows.

First, a cathode is prepared.

To prepare a cathode, a cathode active material, a conducting agent, a binder, and a solvent are mixed together to prepare a cathode slurry composition. In some embodiments, the cathode slurry composition may be directly coated on a cathode current collector to prepare a cathode including a cathode active material layer. In some embodiments, the cathode slurry composition may be cast on a separate support to form a cathode active material film, which may then be separated from the support and laminated on a cathode current collector to prepare a cathode including a cathode active material layer.

The cathode active material may be the foregoing cathode active material. The cathode active material may be any material available in the art suitable for use as a cathode active material, and for example, may be a lithium-containing metal oxide.

Examples of the cathode active material may include a compound selected from at least one of $Li_aA_{1-b}B'_bD'_2$ (where $0.90 \le a \le 1.0$ and $0 \le b \le 0.5$); $Li_aE_{1-b}B'_bO_{2-c}D'_c$ (where $0.90 \le a \le 1.0$, $0 \le b \le 0.5$ and $0 \le c \le 0.05$); $LiE_{2-b}B'_bO_{4-c}D'_c$ (where $0 \le b \le 0.5$ and $0 \le c \le 0.05$); $Li_aNi_{1-b-c}Co_bB'_cD'_\alpha$ (where $0.90 \le a \le 1.0$, $0 \le b \le 0.5$, $0 \le c \le 0.05$, and $0<\alpha \le 2$); $Li_aNi_{1-b-c}Co_bB'_cO_{2-\alpha}F'_\alpha$ (where $0.90 \le a \le 1.0$, $0 \le b \le 0.5$, $0 \le c \le 0.05$, and $0<\alpha<2$); $Li_aNi_{1-b-c}Co_bB'_cO_{2-\alpha}F'_2$ (where $0.90 \le a \le 1.0$, $0 \le b \le 0.5$, $0 \le c \le 0.05$, and $0<\alpha<2$); $Li_aNi_{1-b-c}Mn_bB'_cD'_\alpha$ (where $0.90 \le a \le 1.0$, $0 \le b \le 0.5$, $0 \le c \le 0.05$, and $0<\alpha \le 2$); $Li_aNi_{1-b-c}Mn_bB'_cO_{2-\alpha}F'_\alpha$ (where $0.90 \le a \le 1.0$, $0 \le b \le 0.5$, $0 \le c \le 0.05$, and $0<\alpha<2$); $Li_aNi_{1-b-c}Mn_bB'_cO_{2-\alpha}F'_2$ (where $0.90 \le a \le 1.0$, $0 \le b \le 0.5$, $0 \le c \le 0.05$, and $0<\alpha<2$); $Li_a$-

$Ni_bE_cG_dO_2$ (where 0.90≤a≤1.0, 0≤b≤0.9, 0≤c≤0.5, and 0.001≤d≤0.1.); $Li_aNi_bCo_cMn_dG_eO_2$ (where 0.90≤a≤1.0, 0≤b≤0.9, 0≤c≤0.5, 0≤d≤0.5, and 0.001≤e≤0.1.); $Li_aNiG_bO_2$ (where 0.90≤a≤1.0 and 0.001≤b≤0.1.); $Li_aCoG_bO_2$ (where 0.90≤a≤1.0 and 0.001≤b≤0.1.); $Li_aMnG_bO_2$ (where 0.90≤a≤1.8 and 0.001≤b≤0.1.); $Li_aMn_2G_bO_4$ (where 0.90≤a≤1.0 and 0.001≤b≤0.1.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$.

In the formulae above, A may include at least one of nickel (Ni), cobalt (Co) and manganese (Mn); B' include at least one of aluminum (Al), nickel (Ni), cobalt (Co), manganese (Mn), chromium (Cr), iron (Fe), magnesium (Mg), strontium (Sr), vanadium (V), and a rare earth element; D' may include at least one of oxygen (O), fluorine (F), sulfur (S), and phosphorus (P); E may include at least one of cobalt (Co) and manganese (Mn); F' may include at least one of fluorine (F), sulfur (S), and phosphorus (P); G may include at least one of aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), and manganese (Mn); may include at least one of chromium (Cr), vanadium (V), iron (Fe), scandium (Sc), and yttrium (Y); and J may include at least one of vanadium (V), chromium (Cr), manganese (Mn), cobalt (Co), nickel (Ni), and copper (Cu).

The compounds listed above as cathode active materials may have a surface coating layer (hereinafter, also referred to as "coating layer"). The cathode material may be a mixture of the compound and a compound having a coating layer may be used. In some embodiments, the coating layer may include a coating element compound selected from at least one of oxide, hydroxide, oxyhydroxide, oxycarbonate, and hydroxycarbonate of the coating element. In some embodiments, the coating layer may be amorphous or crystalline. In some embodiments, the coating element included in the coating layer may include at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), and zirconium (Zr). The coating layer may be formed using any method that does not adversely affect the physical properties of the cathode active material when a compound of the coating element is used, for example, a spray coating method or a dipping method. The coating method may be determined by one of skill in the art without undue experimentation, and thus a detailed description thereof is omitted.

The conducting agent may be at least one of carbon black, graphite particulates, natural graphite, artificial graphite, acetylene black, Ketjen black, carbon fibers, carbon nanotubes, metal powder, metal fibers or metal tubes of copper, nickel, aluminum, or silver, and a conducting polymer such as a polyphenylene derivative. However, the conductive agent is not limited thereto, and any material available suitable as a conducting agent in the art may be used.

Examples of the binder may be at least one of a vinylidene fluoride/hexafluoropropylene copolymer, polyvinylidene fluoride (PVDF), polyacrylonitrile, poly(methyl methacrylate), polytetrafluoroethylene (PTFE), and a styrene butadiene rubber polymer, but embodiments are not limited thereto. Any material suitable as a binding agent in the art may be used. Examples of the solvent are N-methyl-pyrrolidone (NMP), acetone, or water, but embodiments are not limited thereto. Any material suitable as a solvent in the art may be used.

In some embodiments, pores may be formed in the cathode by further including a plasticizing agent in the cathode slurry composition.

The amounts of the cathode active material, the conducting agent, the binder, and the solvent can be determined by one of skill in the art without undue experimentation. One or more of the conducting agent, the binder, and the solvent may be omitted depending upon the desired use and structure of the lithium secondary battery.

A thickness of the cathode current collector may be in a range of about 3 μm to about 500 μm. The cathode current collector is not particularly limited to this thickness as long as the cathode current collector does not generate a chemical change in the battery and has a suitable conductivity. Examples of the cathode current collector may include at least one of copper, stainless steel, aluminum, nickel, titanium, calcined carbon, aluminum, stainless steel surface-treated with carbon, nickel, titanium, silver, and aluminum-cadmium alloy. Also, the cathode current collector may have an uneven microscopic structure at its surface to enhance a binding force of the cathode active material. The cathode current collector may be used in various forms including a film, a sheet, a foil, a net, a porous body, a foaming body, or a non-woven body.

A mixing density of the cathode may be at least 2 grams per cubic centimeter (g/cc).

Next, an anode is prepared. The anode may be prepared in the same manner as the cathode, except that an anode active material is used instead of the cathode active material. Also, the same conducting agent, binder, and solvent used in the preparation of the cathode may be used in the preparation of an anode slurry composition.

For example, an anode active material, a binder, a solvent, and, optionally, a conducting agent, are mixed together to prepare an anode slurry composition. In some embodiments, the anode slurry composition may be directly coated on an anode current collector to prepare an anode. In some embodiments, the anode slurry composition may be cast onto a separate support to form an anode active material film, which may then be separated from the support and laminated on an anode current collector to prepare an anode.

The anode active material may be any material that is in the art that is suitable for use as an anode active material. Examples of the anode active material may include at least one of a lithium metal, a metal that is alloyable with lithium, a transition metal oxide, a non-transition metal oxide, and a carbonaceous material. For example, the metal alloyable with lithium may be Si, Sn, Al, Ge, Pb, Bi, Sb, an Si-Y' alloy (where, Y' is an alkali metal, an alkaline earth metal, a Group 13 element, a Group 14 element, a transition metal, a rare earth element, or a combined element thereof, and is not Si); and a Sn-Y' alloy (where, Y' is an alkali metal, an alkaline earth metal, a Group 13 element, a Group 14 element, a transition metal, a rare earth element, or a combined element thereof, and is not Sn). Examples of the element Y' may include at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

Examples of the transition metal oxide may include a lithium titanium oxide, a vanadium oxide, and a lithium vanadium oxide.

Examples of the non-transition metal oxide may include $SnO_2$ and $SiO_x$ (where, 0<x<2).

The carbon-based material may be at least one of crystalline carbon and amorphous carbon. Examples of the crystalline carbon may include natural graphite and artificial graphite, each of which may independently have at least one of an amorphous shape, a plate shape, a flake shape, a spherical shape, and a fiber shape. Examples of the amorphous carbon may include soft carbon (low-temperature calcined carbon), hard carbon, meso-phase pitch carbide, and calcined cokes.

Amounts of the anode active material, the conducting agent, the binder, and the solvent may be determined by one of skill in the art without undue experimentation.

An anode electrode current collector may have a thickness of about 3 µm to about 500 µm, and may be any suitable current collector that does not cause a chemical change to a battery and has electrical conductivity. Examples of the anode electrode may include at least one of stainless steel, aluminum, nickel, titanium, calcined carbon, and aluminum and stainless steel that are surface-treated with carbon, nickel, titanium, or silver. The anode electrode current collector may have an uneven microscopic structure at its surface to enhance a binding force with the negative active material. Also, the current collector may be used in various forms including a film, a sheet, a foil, a net, a porous body, a foaming body, or a non-woven body.

The cathode and the anode may be separated by a separator, and the separator may be any of various separators that are suitable for use in a lithium secondary battery. In particular, the separator may include a material that has a low resistance to migration of electrolyte ions and an excellent electrolytic solution-retaining capability. For example, the separator may include a material selected from at least one of glass fiber, polyester, Teflon, polyethylene, polypropylene, and polytetrafluoroethylene (PTFE), each of which may be non-woven or woven. The separator may have a pore diameter in a range of about 0.01 µm to about 10 µm, and a thickness in a range of about 5 µm to about 300 µm.

A non-aqueous based electrolyte solution may include a non-aqueous electrolyte and a lithium salt. Examples of the non-aqueous electrolyte may include a non-aqueous electrolyte solution, an organic solid electrolyte, and an inorganic solid electrolyte.

The non-aqueous electrolyte solution may be a non-aprotic organic solvent, and examples of the non-aprotic organic solvent may include at least one of N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include at least one of a polyethylene derivative, a polyethylene oxide derivative, a polypropylene oxide derivative, a phosphoric acid ester polymer, poly-L-lysine, polyester sulfide, polyvinyl alcohol, polyvinylidene fluoride, and a polymer containing one or more ionic dissociation groups.

Examples of the inorganic solid electrolyte may include at least one of nitrides, halides, and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is suitable for use in a lithium secondary battery, and that is soluble in the lithium salt-containing non-aqueous electrolyte. For example, the lithium salt may include at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, and lithium imide.

Lithium secondary batteries may be classified as lithium ion secondary batteries, lithium ion polymer secondary batteries, and lithium polymer secondary batteries depending upon the type of a separator and an electrolyte used therein. In addition, lithium secondary batteries may be further classified as a cylindrical type, a rectangular type, a coin type, and a pouch type depending upon a battery shape, and may also be classified as a bulk type and a thin type depending upon a battery size.

A method of manufacturing a lithium battery is widely known in the art, and thus detailed description thereof will not be provided herein.

Figure 2:
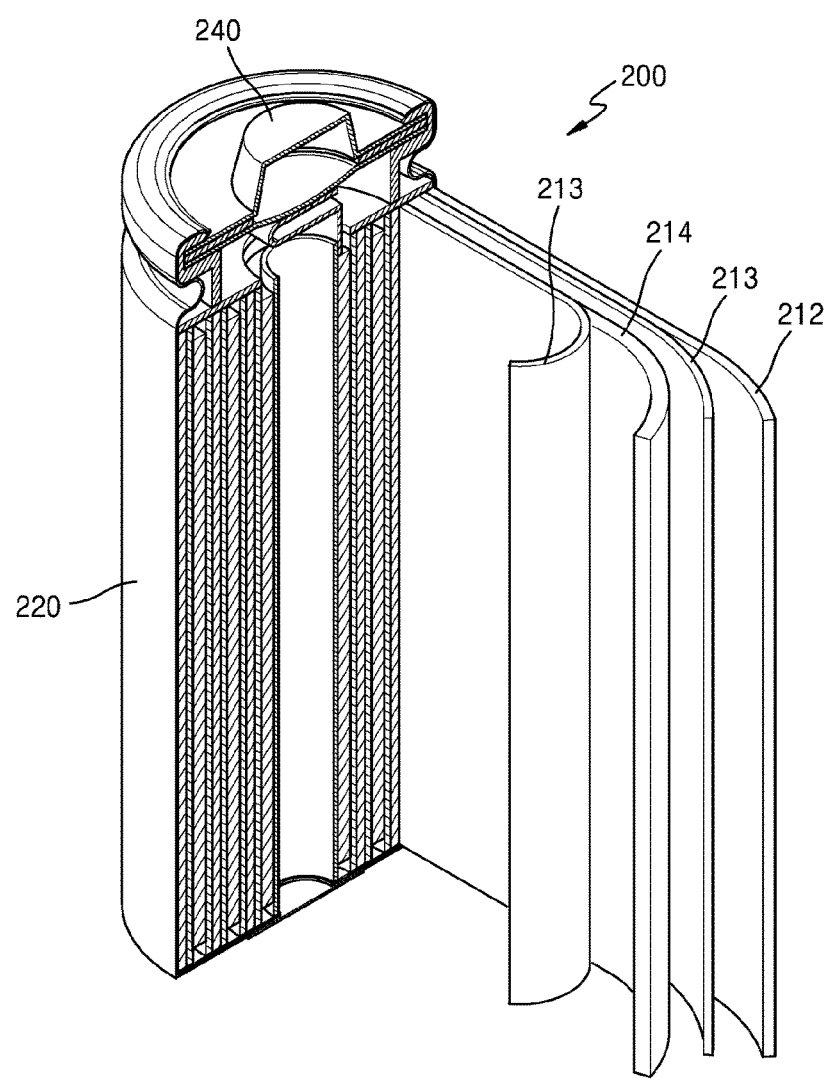
FIG. 2 is a schematic view of a structure of a secondary battery according to another embodiment of the present disclosure.

FIG. 2 is a schematic diagram illustrating a structure of a lithium secondary battery 200 according to an exemplary embodiment.

Referring to FIG. 2, the lithium secondary battery 200 includes a cathode 214, a separator 213, and an anode 212. The cathode 214, the separator 213, and the anode 212 are wound or folded, and then accommodated in a battery case 220. Subsequently, an organic electrolyte solution is injected into the battery case 220, and the battery case 220 is sealed by a sealing member 240 thereby completing the manufacture of the lithium secondary battery 200. The battery case 220 may have a cylindrical shape, a rectangular shape, or a thin-film shape. For example, the lithium secondary battery 200 may be a large thin-film type battery. The lithium secondary battery 200 may be, for example, a lithium ion secondary battery.

A battery assembly may be prepared by disposing a separator between a cathode and an anode. A plurality of the battery assemblies may be stacked in a bi-cell structure and impregnated with the electrolyte solution. The stacked structure is then placed into a pouch and sealed, thereby completing the manufacture of a lithium ion polymer secondary battery.

Also, a plurality of the battery assemblies may be stacked to form a battery pack, which may be used in any device that requires high capacity and high output, for example, in a laptop computer, a smart phone, an electric tool, or an electric vehicle (EV).

According to another embodiment of the present disclosure, a method of preparing a cathode active material may include adding a metal oxide compound precursor and a phosphate compound precursor to a core material capable of intercalating and deintercalating lithium ions to obtain a mixture; drying the mixture, and heat-treating the dried mixture to prepare the cathode active material.

First, a core material capable of intercalating and deintercalating lithium ions is prepared. For example, a precursor of a metal oxide may be heat-treated to prepare the core material.

Then, a metal salt is prepared as an aqueous solution, and a basic solution is added thereto to co-precipitate the precursor of a metal oxide.

The metal salt may include a transition metal. For example, the metal salt aqueous solution may be an aqueous solution of at least one transition metal selected from Mn, Ni, and Co.

The metal salt may be at least one salt selected from a sulfate, a nitrate, an acetate, a halide, and a hydroxide, but any salt that may be dissolved in water may be used as the metal salt.

The basic solution may include at least one selected from $Na_2CO_3$, NaOH, KOH, and $NH_4OH$.

In some embodiments, a precursor of a metal oxide is co-precipitated, for example, by mixing the precursor of the metal oxide with the basic solution at a pH in a range of about 11 to about 13. Here, the co-precipitation may be in a range of about 7 hours to about 10 hours, and at a mixing speed in a range of about 500 rotations per minute (rpm) to about 800 rpm.

The co-precipitated precursor of a metal oxide thus obtained may be mixed with a lithium salt to prepare a lithium compound, and a precursor including the lithium compound may be heat-treated at a temperature in a range of about 600° C. to about 1200° C. to prepare the core material.

The lithium salt may be include at least one selected from $Li_2CO_3$, $LiNO_3$, LiBr, LiCl, LiI, LiOH, $Li(CH_3CO_2)$, $LiH_2PO_4$, $LiOH \cdot H_2O$, and $Li(CH_3CO_2) \cdot 2H_2O$.

A detailed composition of the thus-formed core material capable of intercalating and deintercalating lithium ions is the same as described above, and thus description of the detailed composition will be omitted herein.

Next, a metal oxide compound precursor and a phosphate compound precursor are added to the core material capable of intercalating and deintercalating lithium ions to obtain a mixture.

The metal oxide compound precursor may be selected from at least one of a metal nitrate, a metal hydroxide, a metal alkoxide, and a hydrate thereof. For example, the metal oxide compound precursor may be a metal nitrate hydroxide. In some embodiments, the metal oxide compound precursor may be at least one of $Co(NO_3)_3 \cdot 9H_2O$ and $Fe(NO_3)_3 \cdot 9H_2O$.

The phosphate compound precursor may be selected from $(NH_4)_2HPO_4$ and $NH_4H_2PO_4$. For example, the phosphate compound precursor may be $(NH_4)_2HPO_4$.

The metal oxide compound precursor and the phosphate compound precursor may be mixed together at an appropriate stoichiometric molar ratio to obtain a mixture.

Then, the mixture thus obtained may be dried and heat-treated to prepare the cathode active material described above.

The heat-treatment may be performed in an air atmosphere or an oxidizing atmosphere at a temperature in a range of about 350° C. to about 900° C. In some embodiments, the heat-treatment may be performed in an air atmosphere or an oxidizing atmosphere at a temperature in a range of about 400° C. to about 850° C., or for example, in a range of about 500° C. to about 800° C.

A coating layer including a metal oxide compound and a phosphate compound may be formed by the heat treatment of lithium present on a surface of the core capable of intercalating and deintercalating lithium ions. The coating layer on the core thus includes a composite including a metal oxide compound and a phosphate compound, wherein the metal oxide compound is at least one compound selected from a lithium metal oxide and a metal oxide; the phosphate compound is at least one compound selected from a lithium phosphate, a lithium metal phosphate, and a metal phosphate; and a weight ratio of the phosphate compound to the metal oxide compound in a range of greater than 0 to about 1 may be prepared.

Due to the heat-treatment, a separate washing process for the removal of lithium remaining on a surface of the core is not performed, and thus capacity retaining characteristics, rate characteristics, and lifespan characteristics of the battery may improve, thereby improving overall battery performance.

One or more embodiments will now be described in more detail with reference to the following examples. However, these examples are not intended to limit the scope of the one or more embodiments.

EXAMPLES

Preparation of Cathode Active Material

Example 1

Preparation of Cathode Active Material $NiSO_4 \cdot 6(H_2O)$ (available from Aldrich), as a nickel precursor, $CoSO_4 \cdot 7(H_2O)$ (available from Aldrich), as a cobalt precursor, and $MnSO_4 \cdot 7(H_2O)$ (available from Aldrich), as a manganese precursor, were used.

The nickel precursor, the cobalt precursor, and the manganese precursor were mixed together so that the molar ratio of nickel, cobalt, and manganese in the mixture was 0.8:0.1:0.1. The mixture and a 2 molar (M) $Na_2CO_3$ aqueous solution were added to 4 liters (L) of a 0.2 M $NH_4OH$ solution at a rate of 3 milliliters per minute (mL/min), and a precipitate was obtained by allowing the mixture to react for 10 hours while maintaining the pH of the solution at about 8.

The precipitate was washed with water, dried, and mixed with $Li_2CO_3$ (available from Aldrich) so that a molar ratio of lithium: transition metal (nickel+cobalt+manganese) was 1.03:1. A lithium composite metal oxide ($Li_{1.03}Ni_{0.8}Co_{0.1}Mn_{0.1}O_2$) core having a layered structure was obtained by heat treatment in ambient air at a temperature of 750° C. for 12 hours.

An amount of 0.1 gram (g) of a cobalt oxide compound precursor $Co(NO_3)_3 \cdot 9H_2O$ and 0.4 g of a phosphate compound precursor $(NH_4)_2HPO_4$ were added to the lithium composite metal oxide ($Li_{1.03}Ni_{0.8}Co_{0.1}Mn_{0.1}O_2$) core to prepare a mixture.

The mixture thus obtained was dried in an oven at about 100° C. for about 1 hour and heat-treated in an oxygen atmosphere at about 700° C. for about 5 hours, and thus a cathode active material was prepared having a composite including $Li_{1-x}CoO_2$ (where, $0 \leq x \leq 1$) as a metal oxide compound and $Li_{1-y}CoPO_4$ (where, $0 \leq y \leq 1$) and $Li_3PO_4$ as phosphate compounds, coated on the lithium composite metal oxide ($Li_{1.03}Ni_{0.8}Co_{0.1}Mn_{0.1}O_2$) core.

An amount of the coating layer was about 0.2 wt % based on the total weight of the core. In the cathode active material, an amount of Co was about 0.0001 mol and an amount of P was about 0.008 mol based on 1 mol of the total of the metal elements (e.g. the compound), except for lithium.

Example 2

Preparation of Cathode Active Material

A lithium composite metal oxide core having a layered structure was obtained in the same manner as described in Example 1.

An amount of 0.2 g of an iron oxide compound precursor $Fe(NO_3)_3 \cdot 9H_2O$ and 0.4 g of a phosphate compound precursor $(NH_4)_2HPO_4$ were added to the lithium composite metal oxide $(Li_{1.03}Ni_{0.8}Co_{0.1}Mn_{0.1}O_2)$ core to obtain a mixture.

The mixture was dried in an oven at about 100° C. for about 1 hour and heat-treated in an air atmosphere at about 700° C. for about 5 hours to prepare a cathode active material having a composite including $Li_{1-x}FeO_2$ (where, $0 \leq x \leq 1$) as a metal oxide compound and $Li_3PO_4$ as a phosphate compound, coated on the lithium composite metal oxide $(Li_{1.03}Ni_{0.8}Co_{0.1}Mn_{0.1}O_2)$ core.

Here, an amount of the coating layer was about 0.2 wt % based on the total weight of the core. In the cathode active material, an amount of Fe was about 0.001 mol and an amount of P was about 0.008 mol based on 1 mol of the total of the metal elements except for lithium.

Example 3

Preparation of Cathode Active Material

A cathode active material was obtained in the same manner as in Example 2, except that the cathode active material having a coating layer including $L_{1-x}FeO_2$ (where, $0 \leq x \leq 1$) as a metal oxide compound and $Li_3PO_4$ as a phosphate compound on the lithium composite metal oxide $(Li_{1.03}Ni_{0.8}Co_{0.1}Mn_{0.1}O_2)$ core was prepared by adding 1.1 g of an iron oxide compound precursor $Fe(NO_3)_3.9H_2O$ and 0.7 g of a phosphate compound precursor $(NH_4)_2HPO_4$ to the lithium composite metal oxide $(Li_{1.03}Ni_{0.8}Co_{0.1}Mn_{0.1}O_2)$ core, instead of adding 0.2 g of an iron oxide compound precursor $Fe(NO_3)_3.9H_2O$ and 0.4 g of a phosphate compound precursor $(NH_4)_2HPO_4$ to the lithium composite metal oxide $(Li_{1.03}Ni_{0.8}Co_{0.1}Mn_{0.1}O_2)$ core.

Here, an amount of the coating layer was about 1 wt % based on the total weight of the core. In the cathode active material, an amount of Fe was about 0.0001 mol and an amount of P was about 0.006 mol based on 1 mol of the total amount of metal elements except lithium.

Example 4

Preparation of Cathode Active Material

A cathode active material was obtained in the same manner as described in Example 2, except that the cathode active material having a coating layer including $Li_{1-x}FeO_2$ (where, $0 \leq x \leq 1$) as a metal oxide compound and $Li_3PO_4$ as a phosphate compound on the lithium composite metal oxide $(Li_{1.03}Ni_{0.8}Co_{0.1}Mn_{0.1}O_2)$ core was prepared by adding 5.4 g of an iron oxide compound precursor $Fe(NO_3)_3.9H_2O$ and 2.1 g of a phosphate compound precursor $(NH_4)_2HPO_4$ to the lithium composite metal oxide $(Li_{1.03}Ni_{0.8}Co_{0.1}Mn_{0.1}O_2)$ core, instead of adding 0.2 g of an iron oxide compound precursor $Fe(NO_3)_3.9H_2O$ and 0.4 g of a phosphate compound precursor $(NH_4)_2HPO_4$ to the lithium composite metal oxide $(Li_{1.03}Ni_{0.8}Co_{0.1}Mn_{0.1}O_2)$ core.

Here, an amount of the coating layer was about 5 wt % based on the total weight of the core. In the cathode active material, an amount of Fe was about 0.04 mol and an amount of P was about 0.03 mol based on 1 mol of the total amount of metal elements except lithium.

Comparative Example 1

Preparation of Cathode Active Material

The lithium composite metal oxide $(L_{1.03}Ni_{0.8}Co_{0.1}Mn_{0.1}O_2)$ core having a layered structure prepared in Example 1 was used as a cathode active material.

Comparative Example 2

Preparation of Cathode Active Material

A lithium composite metal oxide core having a layered structure was obtained in the same manner as in Example 1.

An amount of 0.7 g of a phosphate compound precursor $(NH_4)_2HPO_4$ was added to the lithium composite metal oxide $(L_{1.03}Ni_{0.8}Co_{0.1}Mn_{0.1}O_2)$ core to obtain a mixture.

The mixture was dried in an oven at about 100° C. for about 1 hour and heat-treated in an air atmosphere at about 700° C. for about 5 hours to prepare a cathode active material having a coating layer including a phosphate compound $Li_3PO_4$ on the lithium composite metal oxide $(L_{1.03}Ni_{0.8}Co_{0.1}Mn_{0.1}O_2)$ core.

Here, an amount of the coating layer was about 0.6 wt % based on the total weight of the core. In the cathode active material, an amount of P was about 0.006 mol based on 1 mol of the total amount of metal elements except lithium.

Reference Example 1

Preparation of Material for Forming Coating Layer

An amount of 27 g of an iron oxide compound precursor $Fe(NO_3)_3.9H_2O$, 12 g of a phosphate compound precursor $(NH_4)_2HPO_4$, and 1 g of $Li_2CO_3$ and 1 g of LiOH were mixed together to prepare a mixture.

The mixture thus obtained was dried at about 100° C. for about 1 hour and heat-treated in an oxygen atmosphere at about 700° C. for about 5 hours to prepare a material for forming a coating layer.
Preparation of Lithium Battery (Coin-Type Half-Cell)

Example 5

Preparation of Lithium Battery (Coin-Type Half-Cell)

The cathode active material powder prepared in Example 1, a carbon conducting agent (Denka black), and polyvinylidene fluoride (PVDF) dissolved in pyrrolidone, as a binder, were mixed together in a weight ratio of 92:4:4 to prepare a cathode active material slurry.

The cathode active material slurry was coated by bar-coating and dried on an aluminum foil (having a thickness of about 15 μm) at a thickness in a range of about 40 μm to about 50 μm . Then, the resulting film was additionally dried in vacuum at 110° C. to prepare a cathode plate. The cathode plate was roll-pressed to prepare a cathode for a coin-cell having a shape of a sheet.

The cathode, a graphite anode having a diameter of about 1.6 cm, an electrolyte prepared by dissolving 1.3 M of $LiPF_6$ in a solvent mixture including ethylene carbonate, diethyl carbonate, and ethyl methyl carbonate (at a volume ratio of EC/DEC/EMC=3:4:3), were used to prepare a coin-type half-cell.

Examples 6 to 8

Preparation of Lithium Battery (Coin-Type Half-Cell)

Coin-type half-cells were prepared in the same manner as described in Example 5, except that each of cathode active material powders prepared in Examples 2 to 4 was used instead of the cathode active material powder prepared in Example 1.

Comparative Examples 3 and 4

Preparation of Lithium Battery (Coin-Type Half-Cell)

Coin-type half-cells were prepared in the same manner as in Example 5, except that each of cathode active material powders prepared in Comparative Examples 1 and 2 was used instead of the cathode active material powder prepared in Example 1.

Preparation of Lithium Battery (18650 Mini-Full Cell)

Example 9

Preparation of Lithium Battery (18650 Mini-Full Cell)

Preparation of Cathode

The cathode active material powder prepared in Example 1, a carbon conducting agent (Denka black), and polyvinylidene fluoride (PVDF) dissolved in pyrrolidone, as a binder, were mixed together in a weight ratio of 92:4:4 to prepare a cathode active material slurry.

The cathode active material slurry was coated and dried on an aluminum foil (having a thickness of about 15 μm) at a thickness in a range of about 40 μm to about 50 μm using a 3-roll coater. Then, the resultant was additionally dried in vacuum at 110° C. to prepare a cathode plate. The cathode plate was roll-pressed by using a roll press to prepare a cathode for a coin-cell.

(Preparation of Anode)

A graphite powder, a styrene-butadiene rubber (SBR), and carboxy methylcellulose (CMC) were mixed together in a weight ratio of 97:1.5:1.5 to prepare an anode active material slurry.

The anode active material slurry was coated and dried on a copper foil (having a thickness of about 10 μm) at a thickness in a range of about 50 μm to about 60 μm using a 3-roll coater. Then, the resultant was additionally dried in vacuum at 120° C. to prepare an anode plate. The anode plate was roll-pressed to prepare an anode.

Preparation of Lithium Battery (18650 Mini-Full Cell)

The cathode, the anode, an electrolyte prepared by dissolving 1.3 M of $LiPF_6$ in a solvent mixture including ethylene carbonate, diethyl carbonate, and ethyl methyl carbonate (at a volume ratio of EC/DEC/EMC=3:5:2), and a polyethylene separator, were used to prepare a 18650 mini-full cell.

Examples 10 to 12

Preparation of Lithium Battery (18650 Mini-Full Cell)

18650 mini-full cells were prepared in the same manner as described in Example 9, except that each of the cathode active material powders prepared in Examples 2 to 4 was used instead of the cathode active material powder prepared in Example 1.

Comparative Example 5 and 6

Preparation of Lithium Battery (18650 Mini-Full Cell)

18650 mini-full cells were prepared in the same manner as described in Example 9, except that each of the cathode active material powders prepared in Comparative Examples 1 and 2 was used instead of the cathode active material powder prepared in Example 1.

Analysis of Surface, Structure, and Composition of Cathode Active Material

Analysis Example 1

Scanning Electron Microscope (SEM) Analysis

Scanning electron microscope (SEM) analysis was performed on surfaces of the cathode active materials prepared in Example 1, Example 2, and Comparative Example 1. The SEM analysis was performed by observing the surfaces at magnification of ×200,000 using JSM-7600F available from JEOL. The results are shown in FIGS. 3A to 3C.

Figure 3A:
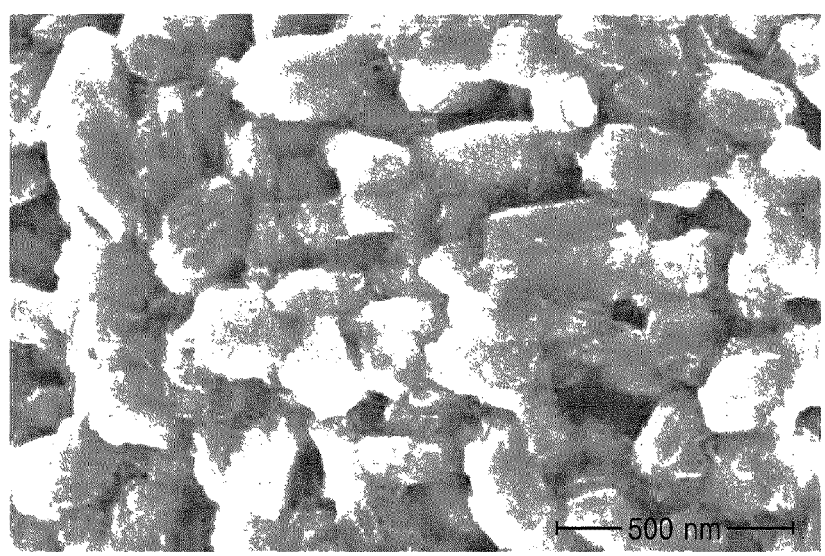
FIGS. 3A, 3B, and 3C are scanning electron microscope (SEM) images of cathode active materials prepared in Examples 1 and 2 and Comparative Example 1, respectively.
Figure 3B:
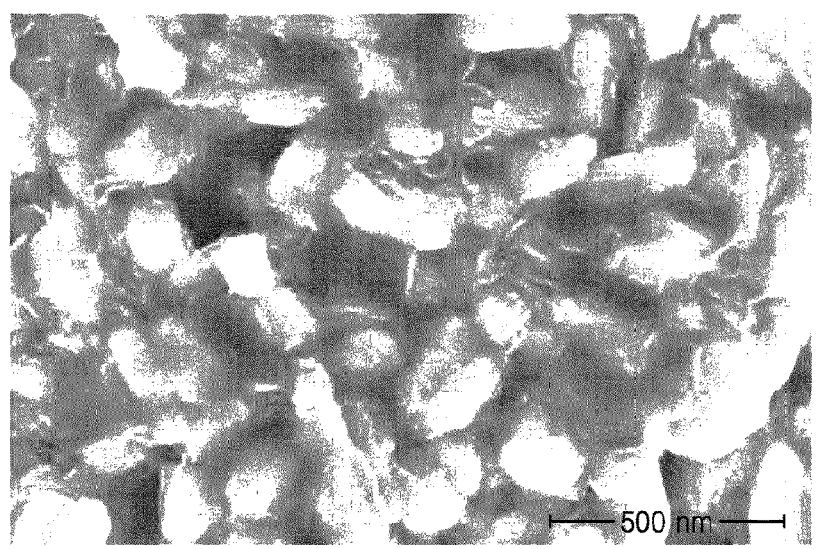
Figure 3C:
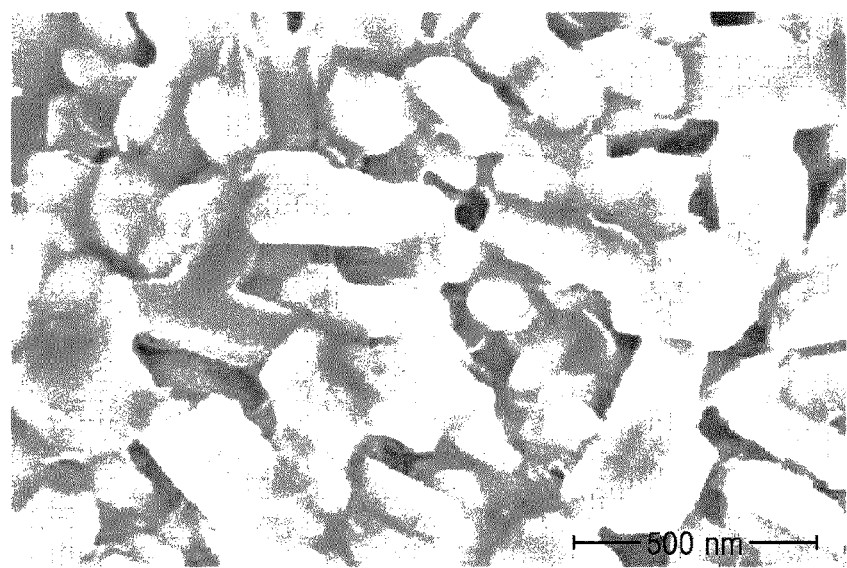

Referring to FIG. 3A, a discontinuous coating layer, e.g. a coating layer of an island type is formed on a surface of the cathode active material prepared in Example 1. Referring to FIG. 3B, a homogenous and substantially continuous coating layer is formed on a surface of the cathode active material prepared in Example 2. Referring to FIG. 3C, a coating layer is not formed on the cathode active material prepared in Comparative Example 1.

Analysis Example 2

X-Ray Diffraction (XRD) Analysis

X-ray diffraction (XRD) analysis was performed on the cathode active materials prepared in Examples 1 to 4 and Comparative Examples 1 and 2. The XRD analysis was performed using Cu-Kα radiation (with a diffractometer Rigaku RINT2200HF$^+$ using a wavelength of 1.540598 Å). The results are shown in FIGS. 4A to 4E.

Figure 4A:
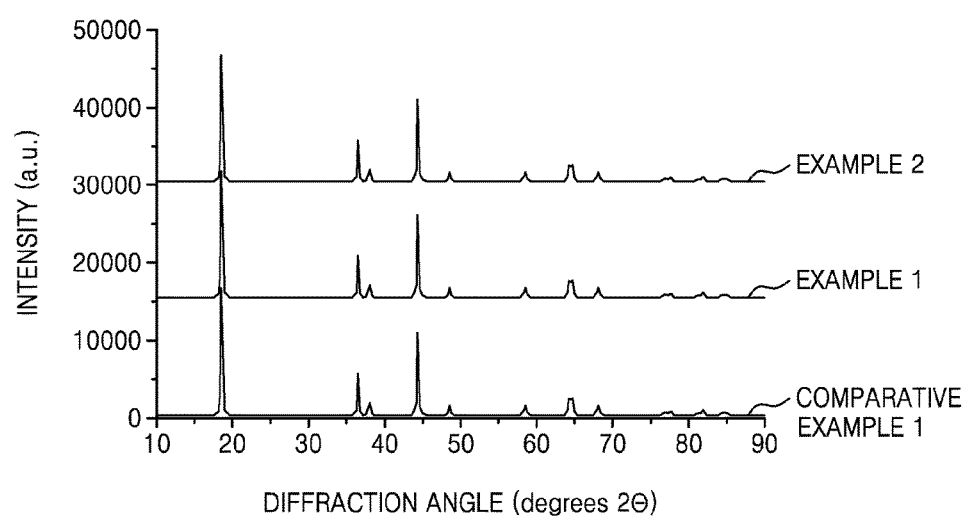
FIG. 4A is a graph of intensity (arbitrary units, a.u.) versus scattering angle (degrees two-theta, 2θ) of the cathode active materials prepared in Examples 1 and 2 and Comparative Example 1.

FIG. 4A shows the results of XRD analysis performed on the cathode active materials prepared in Examples 1 and 2 and Comparative Example 1. As shown in FIG. 4A, it may be confirmed that no structural change occurred in the cathode active materials prepared in Examples 1 and 2 and Comparative Example 1.

Figure 4B:
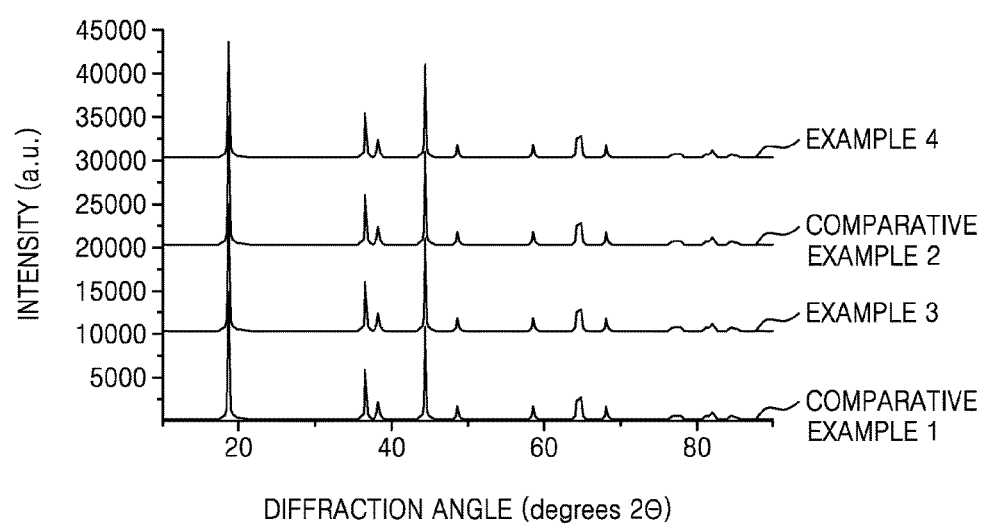
FIG. 4B is a graph of intensity (a.u.) versus scattering angle (degrees two-theta, 2θ) of the cathode active materials prepared in Examples 3 and 4 and Comparative Examples 1 and 2.

FIG. 4B shows the results of XRD analysis performed on the cathode active materials prepared in Examples 3 and 4 and Comparative Examples 1 and 2. As shown in FIG. 4B, it may be confirmed that no structural change occurred in the cathode active materials prepared in Examples 3 and 4 and Comparative Examples 1 and 2.

Figure 4C:
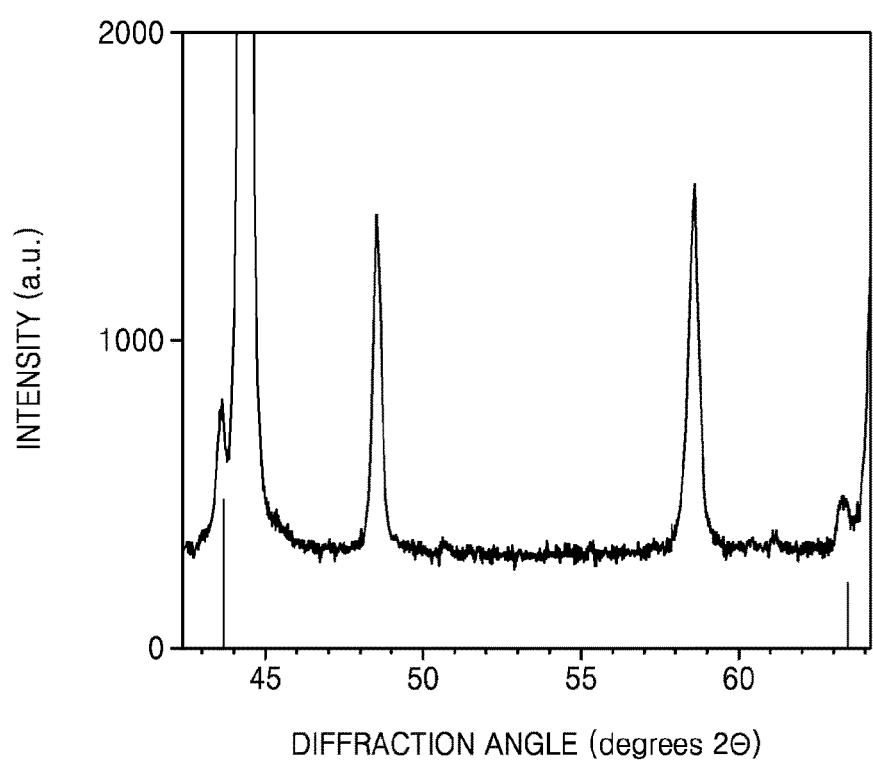
FIGS. 4C and 4D are graphs of intensity (a.u.) versus scattering angle (degrees two-theta, 2θ) of the cathode active material prepared in Example 4.
Figure 4D:
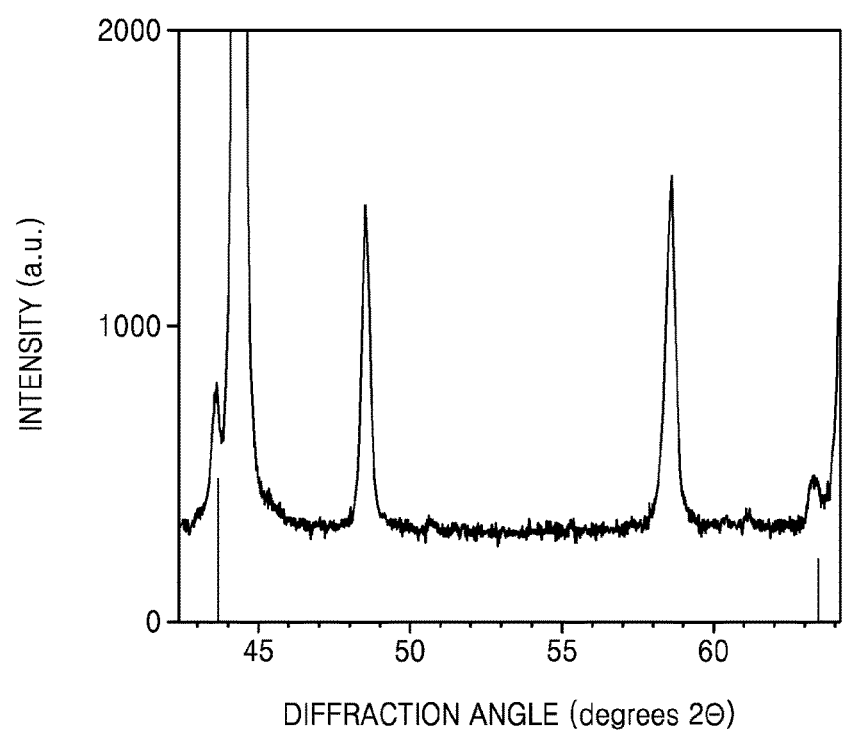
Figure 4E:
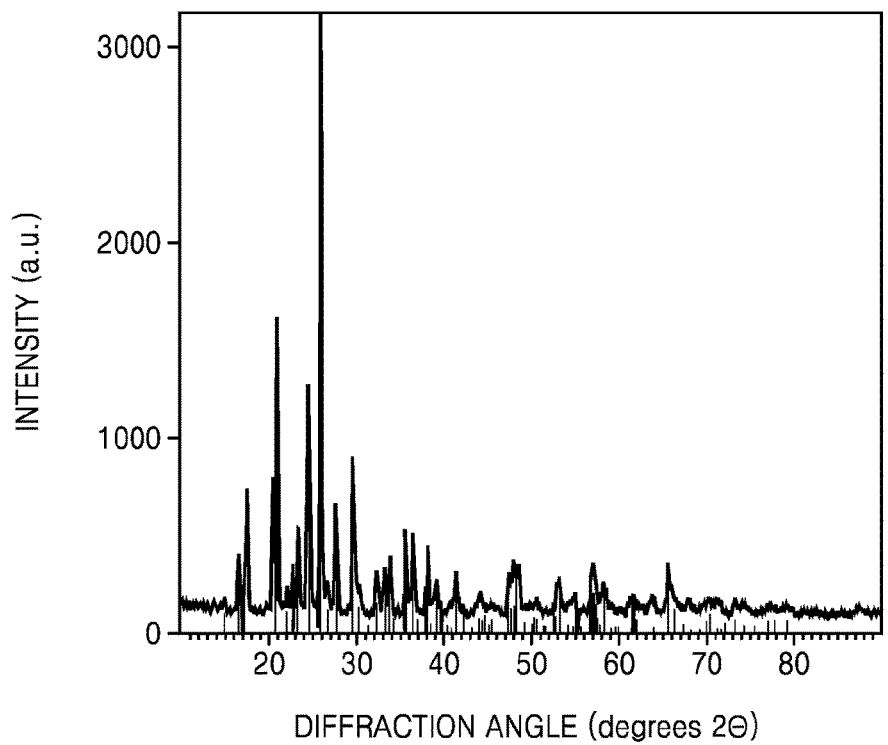
FIG. 4E is a graph of intensity (a.u.) versus scattering angle (degrees two-theta, 2θ) of a material for forming a composite coating layer prepared in Reference Example 1.

FIGS. 4C and 4D are parts of the results of XRD analysis performed on the cathode active material prepared in Example 4, and FIG. 4E is a portion of the results of XRD analysis performed on the material for forming a coating layer prepared in Reference Example 1.

As shown in FIGS. 4C, 4D, and 4E, the cathode active material prepared in Example 4 (FIGS. 4C, 4D) and the material for forming a coating layer prepared in Reference Example 1 (FIG. 4E) each had $LiFeO_2$ and $Li_3(PO_4)$ intensity peaks within a diffraction angle (2θ) range of about 30° to about 80° and about 15° to about 90°. In this regard, it may be confirmed that each of the cathode active materials prepared in Examples 4 and 5 had a coating layer of $LiFeO_2$ and $Li_3(PO_4)$ on a surface thereof.

Also, it may be confirmed that a $LiFeO_2$ peak intensity observed within a diffraction angle (2θ) range of about 30° to about 80° and a $Li_3(PO_4)$ peak intensity observed within a diffraction angle (2θ) range of about 15° to about 90° may be 1.5:1. In this regard, it may be confirmed that a weight ratio of $Li_3(PO_4)$ to $LiFeO_2$ may be 1 or lower.

Analysis Example 3

Ion Couple Plasma (ICP) Analysis

Ion couple plasma (ICP) analysis was performed on the cathode active materials prepared in Examples 1 and 2 and Comparative Example 1. The ICP analysis was performed by using ICPS-8100 (RF source: 27.12 MHz, sample uptake rate: 0.8 mL/min) as ICP AES available from Shimadzu. The results are shown in Table 1.

TABLE 1

| | Molar ratio (%) | | | | |
|---|---|---|---|---|---|
| | Li | Mn | Co | Ni | P | Fe |
| Example 1 | 1.06 | 0.099 | 0.099 | 0.794 | 0.008 | 0 |
| Example 2 | 1.07 | 0.100 | 0.099 | 0.792 | 0.008 | 0.0009 |
| Comparative Example 1 | 1.04 | 0.100 | 0.099 | 0.801 | 0 | 0 |

Referring to Table 1, all of the cathode active materials prepared in Examples 1 and 2 contain element P. The cathode active material prepared in Example 2 contains element Fe. The cathode active material prepared in Comparative Example 1 does not contain elements P and Fe.

Also, it may be confirmed that the element P included in the cathode active materials prepared in Examples 1 and 2 has a molar ratio of about 0.008 based on 1 mol of the total compound except for lithium. It may be confirmed that the element Fe included in the cathode active material prepared in Example 2 has a molar ratio of about 0.0009 based on 1 mol of the total amount of whole metal elements except lithium.

Analysis Example 4

X-ray Photoelectron Spectroscopy (XPS) Analysis

X-ray photoelectron spectroscopy (XPS) analysis was performed on the cathode active materials prepared in Examples 3 and 4 and Comparative Examples 1 and 2. The XPS analysis was performed using Quantum 2000 Micro XPS (Power: 27.7 watts (W), beam size: 100 μm, photoenergy (hγ): 1486.6 eV) available from Physical Electronics. The results are shown in FIGS. 5A to 5D. FIGS. 5A, 5B, 5C, and 5D show the XPS analysis results of Li1s, C1s, Fe2p, and P2p levels, respectively.

Figure 5A:
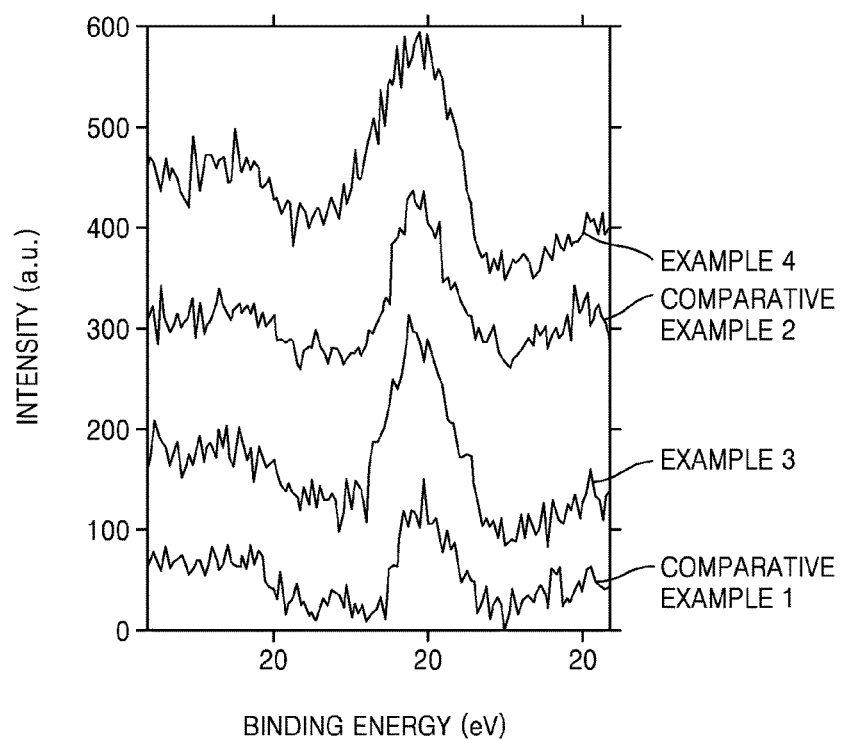
FIGS. 5A, 5B, 5C, and 5D are graphs of intensity (a.u.) versus binding energy (electron volts, eV) of lithium-1s (Li1s), carbon-1s (C1s), iron-2p (2p), and phosphorous-2p (P2p) levels as measured by X-ray photoelectron spectroscopy (XPS) of the cathode active materials prepared in Examples 3 and 4 and Comparative Examples 1 and 2, respectively.
Figure 5B:
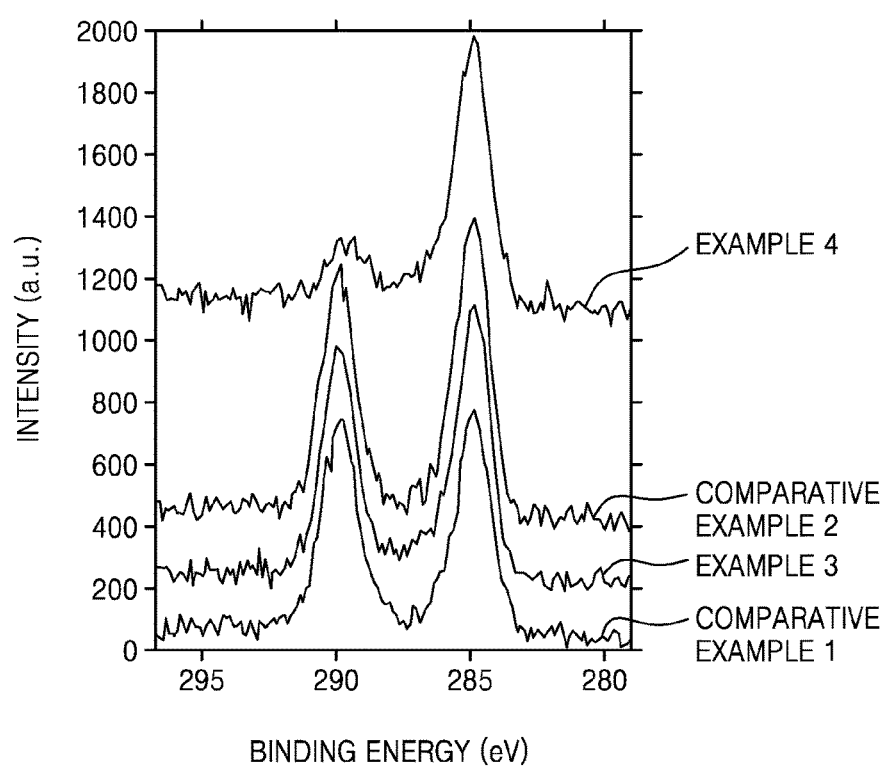
Figure 5C:
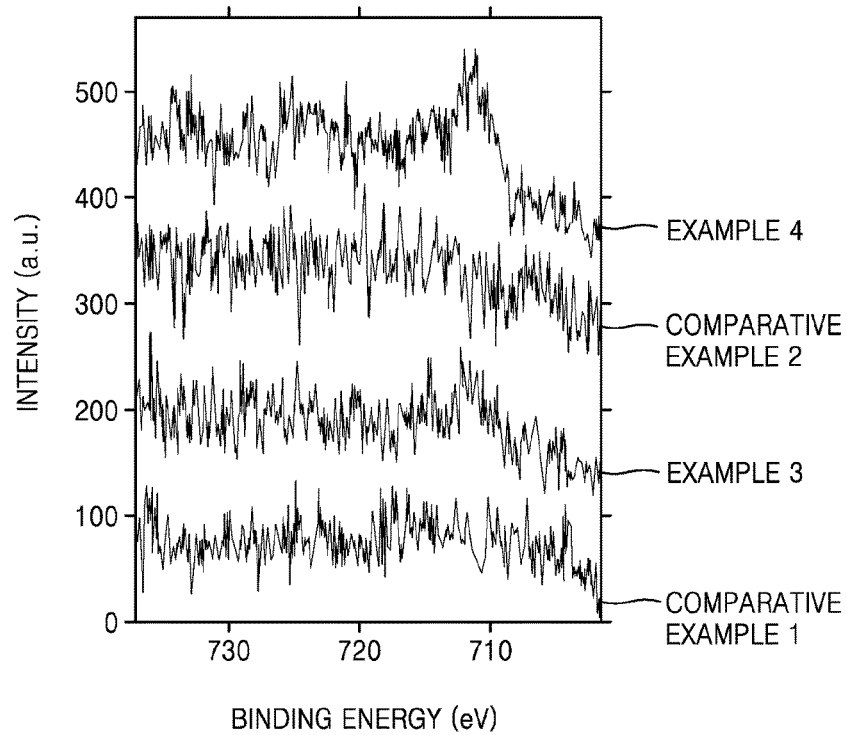
Figure 5D:
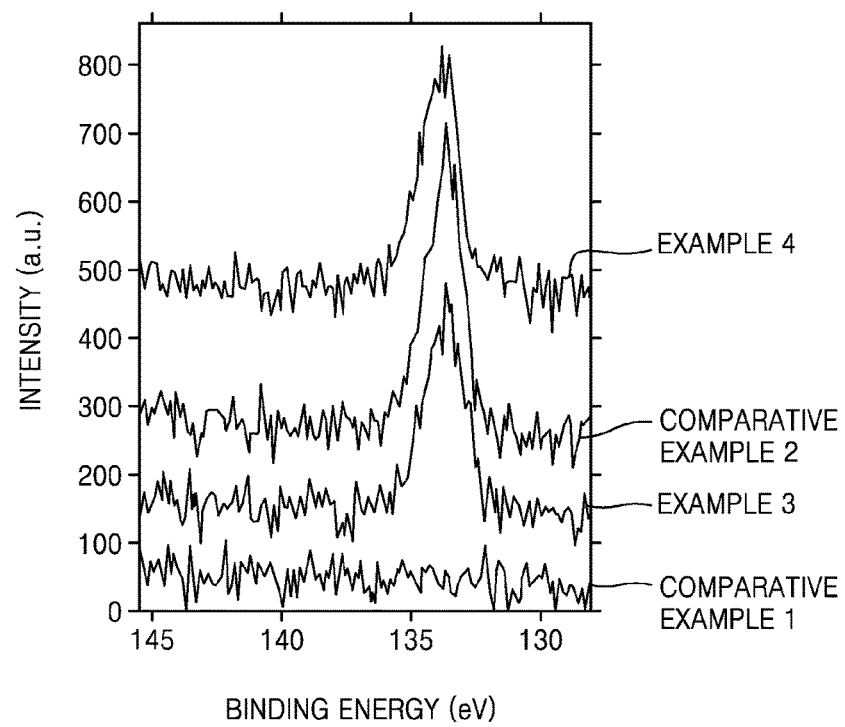

Referring to FIG. 5A, it may be confirmed that the cathode active materials prepared in Examples 3 and 4 and Comparative Examples 1 and 2 contain $Li_3PO_4$ or/and $Li_2CO_3$. Referring to FIG. 5B, it may be confirmed that a considerable amount of the lithium remaining on the cathode active material prepared in Example 4 was removed. Referring to FIG. 5C, it may be confirmed that the cathode active materials prepared in Examples 3 and 4 contain $Fe_2O_3$ or/and $Fe_3PO_4$. Referring to FIG. 5D, it may be confirmed that the cathode active materials prepared in Examples 3 and 4 and Comparative Example 2 contain $Li_3PO_4$ or/and $PD_X$.

Referring to FIGS. 5C and 5D, it may be confirmed that all of the cathode active materials prepared in Examples 3 and 4 have a peak intensity of P2P binding energy in a range of about 130 eV to about 135 eV that is greater than a peak intensity of Fe2P binding energy in a range of about 710 eV to about 715 eV, as measured by an XPS analysis.

Also, it may be confirmed that the cathode active materials prepared in Examples 3 and 4 have a peak intensity ratio of the P2P binding energy to the Fe2P binding energy of about 1:0.1 to about 1:0.4.

Analysis Example 5

Analysis on Amount of Lithium Remained on Cathode Active Material Surface

An amount of 30 g of each of the cathode active materials prepared in Examples 1 to 4 and Comparative Examples 1 and 2 and 100 g of distilled water were added to a container containing a magnetic bar, and the mixed solution was stirred for 30 minutes. pH titration was performed thereon using a 0.1 normal (N) HCl solution until a pH value was 3 or lower, and a flow rate was controlled so that the titration would occur over a period of about 20 minutes to about 30 minutes.

Here, amounts of $Li_2CO_3$ and LiOH remaining on surfaces of the cathode active materials prepared in Examples 1 to 4 and Comparative Examples 1 and 2 were measured. Also, amounts of lithium remaining on the surfaces of the cathode active materials were obtained according to Equation 1. The results are shown in Table 2.

Amount of remaining lithium (ppm)=[amount of $Li_2CO_3$×(molecular amount of Li/molecular amount of $Li_2CO_3$)+amount of LiOH×(molecular amount of Li/molecular amount of LiOH)]    Equation 1

TABLE 2

| | $Li_2CO_3$ (wt %) | LiOH (wt %) | Amount of remaining lithium Parts per million (ppm) |
|---|---|---|---|
| Example 1 | 0.4638 | 0.5323 | 2411 |
| Example 2 | 0.4120 | 0.5106 | 2251 |
| Example 3 | 0.3639 | 0.5345 | 2230 |
| Example 4 | 0.3584 | 0.2725 | 1462 |
| Comparative Example 1 | 0.8847 | 0.5057 | 3125 |
| Comparative Example 2 | 0.5645 | 0.7089 | 3112 |

Referring to Table 2, amounts of the lithium remaining on surfaces of the cathode active materials of Examples 1 to 4 were reduced as compared to that of the cathode active materials of Comparative Examples 1 and 2. Also, the amounts of lithium present on surfaces of the cathode active materials of Examples 1 to 4 was about 23% to about 53% of the amount of lithium on surfaces of the cathode active material prepared in Comparative Example 1.

(Evaluation on Amount of Generated Gas and Charging/Discharging Characteristics)

Evaluation Example 1

Amount of Generated Gas Evaluation

Amounts of gas generated from lithium batteries (18650 mini-full cell) prepared in Example 10 and Comparative Example 5 were evaluated. The amounts of generated gas was determined by measuring amounts of gas generated from the lithium batteries using a gas pressure measuring instrument after charging to a voltage of 4.35 volts (V) and maintaining the voltage at 80° C. for 48 hours. The gas pressure measuring instrument is an apparatus that derives an amount of generated gas by measuring a change in pressure in a volume of the lithium batteries using the ideal gas equation (PV=nRT).

The results of the measurement are shown in Table 3.

TABLE 3

|  | Amount of generated gas Milliliters per gram (ml/g) |
|---|---|
| Example 10 | 4.8 |
| Comparative Example 5 | 5.0 |

Referring to Table 3, an amount of gas generated from the lithium battery (18650 mini-full cell) prepared in Example 10 was decreased as compared to that of the lithium battery (18650 mini-full cell) prepared in Comparative Example 5.

Evaluation Example 2

Charge-Discharge Characteristics Evaluation

Charging/discharging characteristics of the coin-type half-cells prepared in Examples 5 and 6 and Comparative Example 3 were evaluated using a charging/discharging device (Model: HC1005R available from HNT).

2-1. Coulomb Efficiency Rating

Coulombic efficiencies of the coin-type half-cells prepared in Examples 5 and 6 Comparative Example 3 were evaluated at a temperature of 25° C. as follows. In the $1^{st}$ cycle, each of the cells was charged with a constant current until a voltage was 4.35 V at a rate of 0.1 C, and discharged with a constant current until a voltage was 2.8 V at a rate of 0.1 C.

In the $2^{nd}$ cycle, the cells were charged with a constant current until a voltage was 4.35 V at a rate of 0.5 C, subsequently charged with a constant voltage until a current was 0.05 C while the voltage was maintained at 4.35 V, and discharged with a constant current until a voltage was 2.8 V at a rate of 0.2 C.

In the $3^{rd}$ cycle, the cells were charged with a constant current until a voltage was 4.35 V at a rate of 0.5 C, subsequently charged with a constant voltage until a current was 0.05 C while the voltage was maintained at 4.35 V, and discharged with a constant current until a voltage was 2.8 V at a rate of 0.33 C.

In the $4^{th}$ cycle, the cells were charged with a constant current until a voltage was 4.35 V at a rate of 0.5 C, subsequently charged with a constant voltage until a current was 0.05 C while the voltage was maintained at 4.35 V, and discharged with a constant current until a voltage was 2.8 V at a rate of 2.0 C.

In the $5^{th}$ cycle, the cells were charged with a constant current until a voltage was 4.35 V at a rate of 0.5 C, subsequently charged with a constant voltage until a current was 0.05 C while the voltage was maintained at 4.35 V, and discharged with a constant current until a voltage was 2.8 V at a rate of 3.0 C. Such charging/discharging characteristic test was performed up to $40^{th}$ cycle. The results of the test are shown in Table 4. Coulombic efficiencies are defined as shown in Equation 2, and an average coulombic efficiency is defined by an average value of the coulombic efficiencies obtained in each cycle from the $1^{st}$ cycle to the $40^{th}$ cycle.

Coulombic efficiency [%]=[Discharge capacity at each cycle/Charge capacity at each cycle]×100%  Equation 2

TABLE 4

|  | Average coulombic efficiency (%) |
|---|---|
| Example 5 | 99.37 |
| Example 6 | 99.33 |
| Comparative Example 3 | 99.21 |

Referring to Table 4, average coulombic efficiencies of the coin-type half cells prepared in Examples 5 and 6 were improved compared to that of the coin-type half-cell prepared in Comparative Example 3.

2-2. Lifespan Characteristics Evaluation

In order to evaluate coulombic efficiencies, a formation charging/discharging process was performed twice at room temperature (25° C.) on the coin-type half-cells prepared in Examples 5 and 6 and Comparative Example 3.

In the $1^{st}$ formation process, the cells were charged with a constant current until a voltage was 4.35 V at a rate of 0.1 C, and discharged with a constant current until a voltage was 2.8 V at a rate of 0.1 C.

In the $2^{nd}$ formation process, the cells were charged with a constant current until a voltage was 4.35 V at a rate of 0.5 C, and discharged with a constant current until a voltage was 2.8 V at a rate of 0.2 C. The charging/discharging conditions were set as the standard charging/discharging conditions, and the discharge capacity was set as the standard capacity.

Subsequently, the cells were charge with a constant current until a voltage was 4.35 V at a rate of 1.0 C, and discharged with a constant current until a voltage was 2.8 V at a rate of 1.0 C. Such charging/discharging characteristic test was performed up to $60^{th}$ cycle. The results of the test are shown in Table 5 and FIG. 6. Lifespan characteristics are defined as shown in Equation 3.

Capacity retention ratio [%]=[Discharge capacity at $60^{th}$ cycle/discharge capacity at $1^{st}$ cycle]×100  Equation 3

TABLE 5

|  | Capacity retention ratio (%) |
|---|---|
| Example 5 | 90.4 |
| Example 6 | 90.8 |
| Comparative Example 3 | 89.2 |

Figure 6:
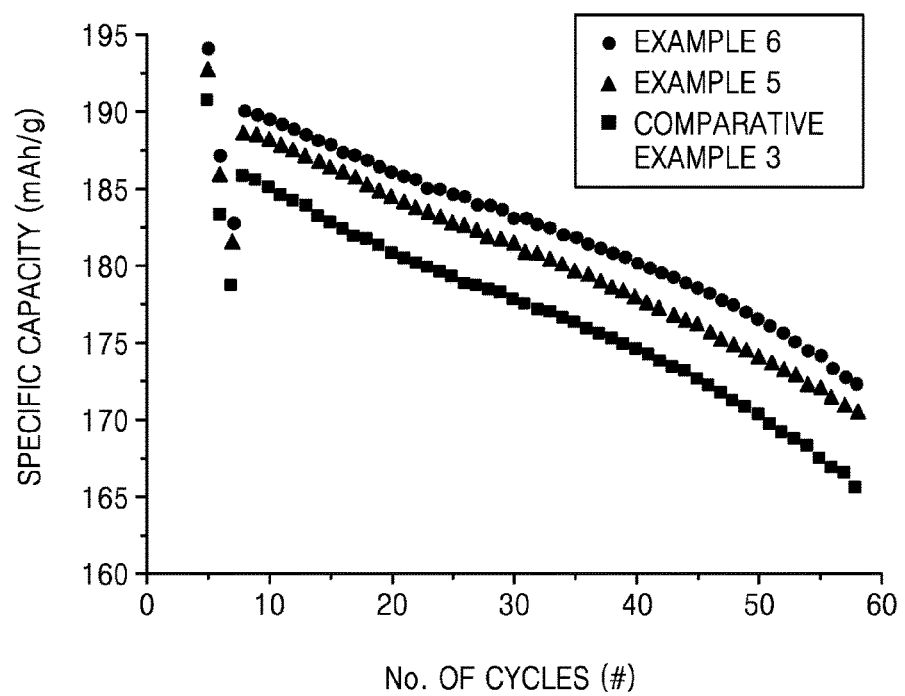
FIG. 6 is a graph of intensity (a.u.) versus binding energy (eV) of the lithium batteries (coin-type half cells) prepared in Examples 5 and 6 and Comparative Example 3.

Referring to Table 5 and FIG. 6, capacity retention ratios of the coin-type half-cells prepared in Examples 5 and 6 were improved compared to that of the coin type half-cell prepared in Comparative Example 3.

As described above, according to one or more embodiments of the present disclosure, when a lithium battery includes a cathode active material including a coating layer including a composite having a weight ratio of a phosphate compound to a metal oxide compound in a range of greater than 0 to about 1 on at least a portion of a core capable of intercalating and deintercalating lithium ions, the capacity, rate characteristics, and lifespan characteristics of the battery may improve.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made herein without departing from the spirit and scope as defined by the following claims.

What is claimed is:

1. A cathode active material comprising:
   a core capable of intercalating and deintercalating lithium ions; and
   a coating layer on at least a portion of the core,
   wherein the coating layer comprises a composite comprising a metal oxide compound and a phosphate compound,
   wherein the metal oxide compound is at least one compound selected from a lithium metal oxide and a metal oxide,
   wherein the phosphate compound is at least one compound selected from a lithium phosphate, a lithium metal phosphate, and a metal phosphate, and
   wherein a weight ratio of the phosphate compound to the metal oxide compound is in a range of greater than 0 to about 1.

2. The cathode active material of claim 1, wherein the metal oxide compound is the lithium metal oxide, and
   the phosphate compound comprises lithium phosphate and the lithium metal phosphate.

3. The cathode active material of claim 2, wherein the phosphate compound further comprises the metal phosphate.

4. The cathode active material of claim 1, wherein the lithium metal oxide and the metal oxide are a compound represented by Formula 1:

  $\qquad$ Formula 1 wherein, in Formula 1, $0 \leq x \leq 1$, and
M is at least one metal element selected from Fe, Co, Mn, Al, Ni, Zr, Zn, and V.

5. The cathode active material of claim 4, wherein M is at least one metal selected from Fe and Co.

6. The cathode active material of claim 1, wherein the lithium phosphate comprises at least one compound selected from $Li_3PO_4$, $LiPO_3$, $Li_4P_2O_7$, and $Li_2O$-$P_2O_5$.

7. The cathode active material of claim 1, wherein the lithium metal phosphate and the metal phosphate are independently at least one compound selected from a compound represented by Formula 2 and a compound represented by Formula 3:

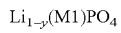  $\qquad$ Formula 2 wherein, in Formula 2, $0 \leq y \leq 1$, and M1 is at least one metal element selected from Fe, Co, V, Mn, Ni, Zr, and Zn,

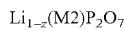  $\qquad$ Formula 3 wherein, in Formula 3, $0 \leq z \leq 1$, and M2 is at least one metal element selected from Fe, Co, V, Mn, Ni, Zr, and Zn.

8. The cathode active material of claim 7, wherein M1 and M2 are Fe.

9. The cathode active material of claim 7, wherein element M1 or M2 has a molar ratio in a range of about 0.0001 to about 0.1 based on 1 mole of the compound, except for lithium.

10. The cathode active material of claim 7, wherein the element P has a molar ratio in a range of about 0.0001 to about 0.1 based on 1 mole of the compound, except lithium.

11. The cathode active material of claim 1, wherein the phosphate compound comprises a compound represented by Formula 4:

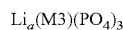  $\qquad$ Formula 4 wherein, in Formula 4, $0 \leq a \leq 1$, and M3 is a metal element selected from Fe, V, and Ti.

12. The cathode active material of claim 1, wherein the coating layer comprises at least one compound selected from $LiFeO_2$ and $Li_3PO_4$.

13. The cathode active material of claim 12, wherein the coating layer further comprises at least one compound selected from $FePO_4$, $Li_3Fe_2(PO_4)_3$, and $LiFePO_4$.

14. The cathode active material of claim 1, wherein an amount of the coating layer is about 0.1 weight percent to about 10 weight percent based on the total weight of the core.

15. The cathode active material of claim 1, wherein, a peak intensity of a phosphorous 2p binding energy in a range of about 130 electron volts to about 135 electron volts is greater than a peak intensity of an iron 2p binding energy in a range of about 710 eV to about 715 eV, as measured by X-ray photoelectron spectroscopy.

16. The cathode active material of claim 15, wherein a peak intensity ratio of the phosphorous 2p binding energy to the iron 2p binding energy is in a range of about 1:0.1 to about 1:0.9.

17. The cathode active material of claim 1, wherein an amount of lithium present on a surface of the core is about 20 weight percent to about 60 weight percent of an amount of lithium present on a surface of a core of a cathode active material which does not comprise the coating layer and is capable of intercalating and deintercalating lithium ions.

18. The cathode active material of claim 1, wherein the core has a layered structure.

19. The cathode active material of claim 1, wherein the core comprises a compound represented by Formula 5:

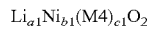  $\qquad$ Formula 5 wherein, in Formula 5, $0.8 < a1 < 1.3$, $0.5 \leq b1 < 1.0$, and $0 < c1 \leq 0.5$; and M4 is at least one metal element selected from Mn, V, Cr, Fe, Co, Zr, Re, Al, B, Mg, Ga, Ge, Nb, Zn, Cd, Ti, V, Ca, Si, Cu, Sn, Sr, Sc, W, and Y.

20. A lithium battery comprising:
   a cathode comprising the cathode active material of claim 1;
   an anode; and
   an electrolyte between the cathode and the anode.

21. A method of preparing a cathode active material, the method comprising:
   adding a metal oxide compound precursor and a phosphate compound precursor to a core material capable of intercalating and deintercalating lithium ions to obtain a mixture; and
   drying the mixture; and heat-treating the dried mixture to prepare a cathode active material, the cathode active material comprising:

a core capable of intercalating and deintercalating lithium ions; and a coating layer on at least a portion of the core, wherein the coating layer is a composite coating layer comprising a metal oxide compound and a phosphate compound, the metal oxide compound is at least one compound selected from a lithium metal oxide and a metal oxide, and the phosphate compound is at least one compound selected from lithium phosphate, a lithium metal phosphate, and a metal phosphate, and wherein a weight ratio of the phosphate compound to the metal oxide compound is greater than 0 to about 1.

22. The method of claim 21, wherein the metal oxide compound precursor is at least one selected from a metal nitrate, a metal hydroxide, a metal alkoxide, and a hydride thereof.

23. The method of claim 21, wherein the phosphate compound precursor is at least one selected from $(NH_4)_2HPO_4$ and $NH_4H_2PO_4$.

24. The method of claim 21, wherein the heat-treating of the mixture is performed in an air atmosphere or an oxide atmosphere at a temperature in a range of about 350° C. to about 900° C.

25. The method of claim 21, wherein an amount of lithium on a surface of the core is about 20 weight percent to about 60 weight percent of an amount of lithium on a core of a cathode active material which does not comprise a coating layer and is capable of intercalating and deintercalating lithium ions.

* * * * *